United States Patent
Hildreth

(10) Patent No.: US 10,658,685 B2
(45) Date of Patent: May 19, 2020

(54) INTEGRATED HEAT PUMP AND FUEL CELL POWER PLANT

(71) Applicant: DOOSAN FUEL CELL AMERICA, INC., Atlanta, GA (US)

(72) Inventor: Derek Hildreth, Temecula, CA (US)

(73) Assignee: DOOSAN FUEL CELL AMERICA, INC., South Windsor, CT (US)

( * ) Notice: Subject to any disclaimer, the term of this patent is extended or adjusted under 35 U.S.C. 154(b) by 1085 days.

(21) Appl. No.: 14/949,920

(22) Filed: Nov. 24, 2015

(65) Prior Publication Data

US 2017/0149072 A1    May 25, 2017

(51) Int. Cl.
| H01M 8/04029 | (2016.01) |
| H01M 8/04007 | (2016.01) |
| F25B 30/00 | (2006.01) |
| H01M 8/086 | (2016.01) |

(52) U.S. Cl.
CPC ......... *H01M 8/04067* (2013.01); *F25B 30/00* (2013.01); *H01M 8/04029* (2013.01); *H01M 8/04007* (2013.01); *H01M 8/086* (2013.01); *H01M 2250/405* (2013.01); *Y02B 90/16* (2013.01)

(58) Field of Classification Search
None
See application file for complete search history.

(56) References Cited

U.S. PATENT DOCUMENTS

| 6,370,903 | B1 | 4/2002 | Wlech |
| 6,465,118 | B1 | 10/2002 | Dickman et al. |
| 7,086,246 | B2 | 8/2006 | Yoshii et al. |
| 7,160,641 | B2 | 1/2007 | Jorgensen et al. |
| 8,445,155 | B2 | 5/2013 | Park |
| 8,822,095 | B2 | 9/2014 | Hannesen et al. |
| 2003/0203258 | A1 | 10/2003 | Yang et al. |
| 2005/0022550 | A1 | 2/2005 | Yoshii et al. |
| 2006/0150652 | A1 | 7/2006 | Choi et al. |
| 2012/0315562 | A1 | 12/2012 | Park |

FOREIGN PATENT DOCUMENTS

JP    2012-038688 A    2/2012

OTHER PUBLICATIONS

Takahashi et al., JP 2012038688 A—machine translation.*
First Search Report for CN Application No. 201611044874.2 dated Aug. 22, 2019.

* cited by examiner

*Primary Examiner* — Haixia Zhang
(74) *Attorney, Agent, or Firm* — Carlson, Gaskey & Olds

(57) ABSTRACT

An illustrative example system includes at least one fuel cell that is configured to generate electricity based on an electrochemical reaction. The fuel cell includes an exhaust. A heat pump includes an evaporator, a condenser, a compressor, and an expansion valve. A coolant loop is external to the at least one fuel cell. The coolant loop has a first portion associated with the exhaust such that heat from the exhaust increases a temperature of coolant fluid in the first portion. The coolant loop has a second portion downstream of the first portion. The second portion of the coolant loop is associated with the evaporator such that heat from the coolant fluid in the second portion increases the temperature of the evaporator.

6 Claims, 2 Drawing Sheets

INTEGRATED HEAT PUMP AND FUEL CELL POWER PLANT

BACKGROUND

Fuel cells are useful for generating electricity based on an electrochemical reaction. Different types of fuel cells are known. Typical by-products of fuel cell operation include water and heat. There have been various proposals to obtain a benefit from the heat produced during fuel cell operation.

For example, it has been suggested to combine a heat pump and fuel cell arrangement. U.S. Pat. No. 6,370,903 shows an arrangement for use on a vehicle that includes a fuel cell as a source of power for the vehicle. Another arrangement is shown in U.S. Pat. No. 8,445,155. One drawback of that arrangement is that it requires separate piping associated with heat exchangers of a fuel cell, which increases system complexity and cost.

Those skilled in the art are striving to find enhanced and improved energy supply systems. A system designed according to an embodiment of this invention achieves that goal.

SUMMARY

An illustrative example system includes at least one fuel cell that is configured to generate electricity based on an electrochemical reaction. The fuel cell includes an exhaust. A heat pump includes an evaporator, a condenser, a compressor, and an expansion valve. A coolant loop is external to the at least one fuel cell. The coolant loop has a first portion associated with the exhaust such that heat from the exhaust increases a temperature of coolant fluid in the first portion. The coolant loop has a second portion downstream of the first portion. The second portion of the coolant loop is associated with the evaporator such that heat from the coolant fluid in the second portion increases the temperature of the evaporator.

An example system having one or more features of the system of the previous paragraph includes a bypass valve coupled with the second portion. The bypass valve is selectively actuated to direct coolant fluid in the second portion to selectively control heat transfer from the second portion to the evaporator.

An example system having one or more features of the system of either of the previous paragraphs includes an exhaust condenser associated with the exhaust. The first portion of the coolant loop is situated for heat from the exhaust condenser to increase the temperature of coolant fluid in the first portion.

An example system having one or more features of the system of any of the previous paragraphs includes a high grade heat exchanger associated with the fuel cell. A heat delivery network downstream of the condenser of the heat pump directs heated fluid at least partially through the high grade heat exchanger.

In an example system having one or more features of the system of any of the previous paragraphs, the fuel cell includes a plurality of fuel cell stack assemblies, each including an exhaust. The coolant loop has respective first portions associated with each of the exhausts. Each of the first portions of the coolant loop delivers coolant fluid to the second portion.

An example system having one or more features of the system of any of the previous paragraphs, the coolant loop includes a third portion that carries coolant fluid from the second portion toward the exhaust and the coolant loop includes at least one heat dissipation element situated to decrease the temperature of coolant fluid in the third portion.

In an example system having one or more features of the system of any of the previous paragraphs, the temperature of coolant fluid in the first portion is between 40° and 60° C., a temperature of coolant fluid in the second portion upstream of the evaporator is approximately the same as the temperature of the coolant fluid in the first portion, and a temperature of coolant fluid in the second portion downstream of the evaporator is between 20° and 30° C.

An illustrative example method includes generating electricity from an electrochemical reaction in at least one fuel cell that has an associated exhaust; absorbing heat from the exhaust to increase the temperature of a coolant fluid; directing at least some of the coolant fluid to an evaporator of a heat pump that includes the evaporator, a condenser, a compressor and an expansion valve; and increasing a temperature of the evaporator of the heat pump using the coolant fluid.

An example method having one or more features of the method of the previous paragraph includes controlling a bypass valve for selectively controlling whether the coolant fluid increases the temperature of the evaporator.

An example method having one or more features of the method of either of the previous paragraphs includes a high grade heat exchanger associated with the fuel cell. The method includes directing heated fluid from the condenser of the heat pump at least partially through the high grade heat exchanger.

In an example method having one or more features of the method of any of the previous paragraphs, a temperature of coolant fluid flowing between the exhaust and the evaporator is between 40° and 60° C.; and a temperature of coolant fluid flowing between the evaporator and the exhaust is between 20° and 30° C.

The various features and advantages of at least one disclosed example embodiment will become apparent to those skilled in the art from the following detailed description. The drawings that accompany the detailed description can be briefly described as follows.

DETAILED DESCRIPTION

Figure 1:
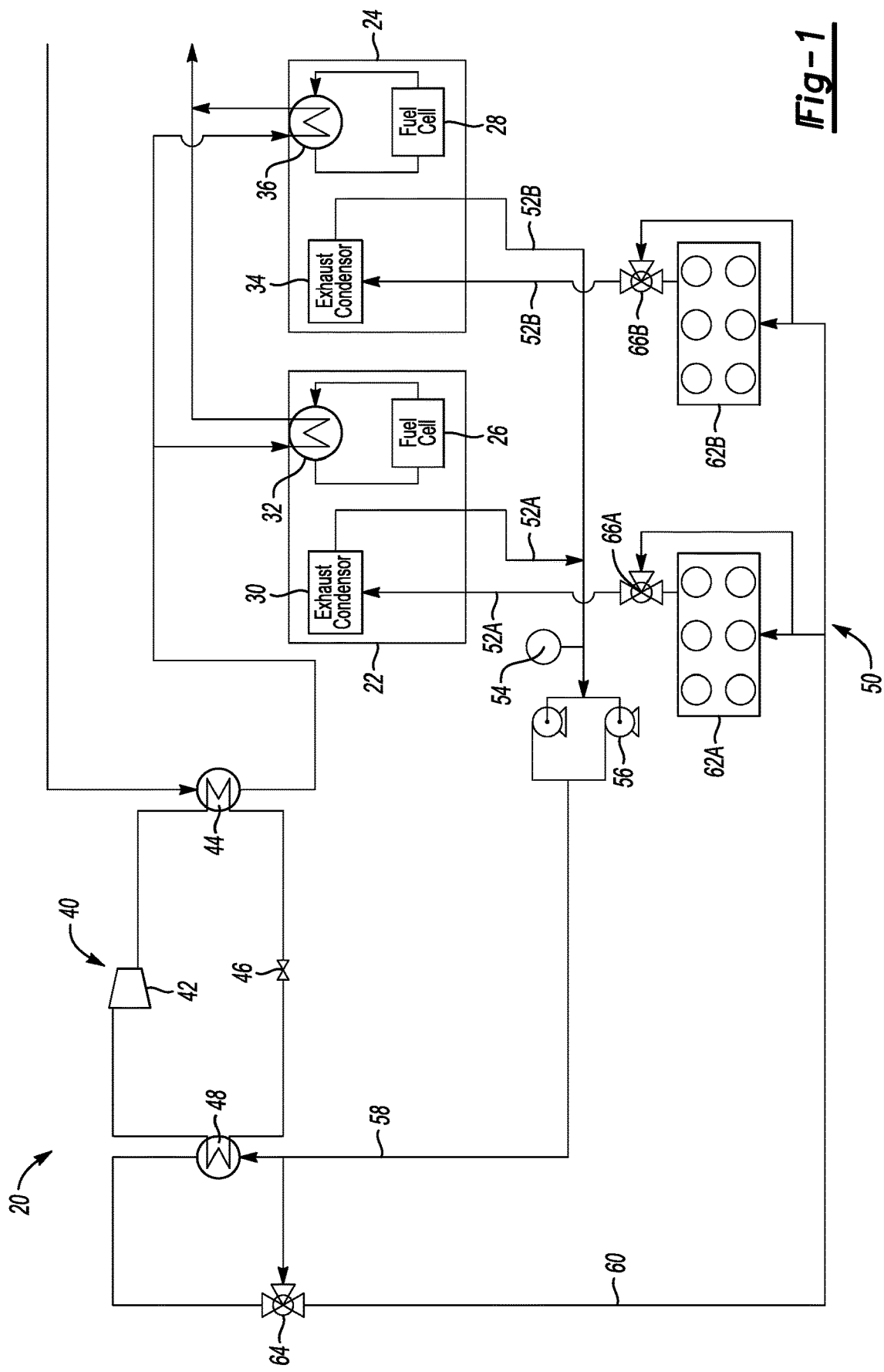
FIG. 1 schematically illustrates a system designed according to an embodiment of this invention that integrates a heat pump with a fuel cell power plant.

FIG. 1 schematically illustrates a system 20 including a fuel cell power plant having a first fuel cell power plant unit 22 and a second fuel cell power plant unit 24. The first fuel cell power plant unit 22 includes at least one fuel cell stack assembly 26 that includes a plurality of fuel cells that generate electricity based on an electrochemical reaction. In one example embodiment, the individual fuel cells are electrolyte based and utilize phosphoric acid as the electrolyte. For purposes of discussion, example fuel cells will be referred to as phosphoric acid fuel cells (PAFCs). The second fuel cell power plant unit 24 includes at least one cell stack assembly 28. Only two fuel cell power plant units 24 are illustrated for discussion purposes but in an actual embodiment the number of power plant units, each having at least one fuel cell stack, may be much higher.

The fuel cell power plant unit 22 includes an exhaust 30, which in this example has an exhaust condenser. The exhaust 30 is associated with the cell stack assembly 26 to eject air byproducts resulting from the generation of electricity. The exhaust 30 in some examples is also coupled with a reformer (not illustrated) that is used for supplying fuel to the cell stack assembly 26. In embodiments that include a reformer exhaust associated with the condenser of the exhaust 30, the temperature at the condenser may be higher compared to embodiments where the reformer exhaust is separate from the fuel cell exhaust.

The fuel cell power plant unit 22 includes a high grade heat exchanger 32 associated with the cell stack assembly 26. One feature of the illustrated example embodiment is that there is no low grade heat exchanger associated with the cell stack assembly 26. Eliminating one of the heat exchangers that is often used in fuel cell power plants provides economies including reducing system cost by eliminating a heat exchanger.

The second fuel cell power plant unit 24 includes an exhaust 34 and a high grade heat exchanger 36, both of which are associated with the cell stack assembly 28.

The system 20 includes a heat pump 40 that is integrated with the fuel cell power plant. The heat pump 40 includes a compressor 42, a condenser 44, an expansion valve 46, and an evaporator 48. The heat pump 40 operates in a known manner and is capable of providing heat or cooling depending on the direction of flow within the circuit of the heat pump 40.

The system 20 also includes an auxiliary coolant circuit 50 that is external to the cell stack assembly 26. The coolant circuit 50 is distinct from any coolant used within the cell stack assembly 26, such as a coolant fluid used for directly cooling the cell stack assembly components. Instead, the coolant circuit 50 is associated with the exhaust 30 and 34 of the fuel cell power plant units. The coolant circuit 50 is configured to increase efficiency of the heat pump 40 based on heat obtained from the exhaust 30 and 34.

In the example of FIG. 1, there are multiple fuel cell power plant units and the coolant circuit 50 has some duplicated parts that are dedicated to each of those units. For example, a first portion of the coolant circuit 50 is shown at 52A and 52B. The first portion carries a coolant fluid, such as glycol, toward the exhaust 30 and 34, respectively, where the temperature of the coolant is increased based on heat present at the exhaust. The coolant fluid flows through the first portion 52A, 52B to an expansion tank 54 and pump 56. A second portion 58 of the coolant circuit directs coolant to the evaporator 48 of the heat pump 40. The coolant fluid in the second portion 58 increases the temperature of the evaporator 48. Such additional heat provided to the evaporator 48 increases the heat output of the heat pump 40 when it is operating in a heating mode. A third portion 60 of the coolant circuit 50 carries coolant fluid back toward the first portion 52A, 52B.

The illustrated example includes dedicated cooling modules 62A and 62B associated with the fuel cell power plant units 22 and 24, respectively. The dedicated cooling modules 62A and 62B in one example operate in a known manner to reduce a temperature of the coolant fluid as may be needed, depending on the circumstances. One example circumstance may be when the heat pump 40 is not operating during service.

Bypass control valves 64 and 66 are provided to selectively direct coolant fluid within the cooling circuit 50 depending on the needs of a particular situation. The bypass valve 64 allows for controlling how much or whether coolant fluid is provided to the evaporator 48. There may be circumstances, such as when the heat pump 40 is used for cooling, when heating the evaporator 48 is not desired. The bypass valve 64 allows for coolant in the second portion 58 to be diverted away from the evaporator 48 under such circumstances. Additionally, when the heating needs at the evaporator 48 are at a relatively low level, at least some of the coolant fluid from the second portion 58 may be diverted away from the evaporator 48 using the bypass valve 64.

The bypass valves 66A and 66B are useful for controlling whether coolant fluid flows through the respective cooling modules 62A, 62B.

In an example embodiment, the temperature of the exhaust 30, 34 is on the order of 60° C. Coolant fluid within the first portion 52A, 52B of the coolant circuit 50 may be on the order of 40° to 60° C. A temperature of the coolant fluid in the second portion 58 typically corresponds to or is equal to the temperature of the coolant fluid in the first portion 52a, 52B. After heat from the coolant is absorbed and the temperature of the evaporator 48 is increased, a temperature of the coolant fluid in the third portion 60 of the coolant circuit 50 may be on the order of 20° to 30° C.

Utilizing heat from the exhaust 30, 34 provides for higher thermal efficiency than previously suggested arrangements, in part, because the coolant circuit 50 is auxiliary and external to the cell stack assemblies 26, 28. Additionally, the disclosed embodiment does not rely upon a heat exchanger such as a low grade heat exchanger of a fuel cell power plant. Utilizing the exhaust of a fuel cell power plant unit provides enhanced energy usage efficiency, in part, by eliminating the pinch otherwise associated with attempting to obtain supplemental heat from a fuel cell stack assembly low grade heat exchanger.

One feature of the example of FIG. 1 is that it allows for fluid from the condenser 44 to be heated by the high grade heat exchangers 32, 36. When a customer demand is at a high level, the temperature of the fluid leaving the condenser 44 may be on the order of 70° to 80° C. By allowing such fluid to be heated by the high grade heat exchangers 32, 36 (or only one of them if desired), the temperature of the fluid used for providing heat to meet the customer demand may be on the order of 90° to 100° C. Although not specifically illustrated in FIG. 1, fluid flow associated with the high grade heat exchangers 32 and 36 may be selectively controlled using a programmed controller and appropriate valves that those skilled in the art will appreciate after having considered this description.

Figure 2:
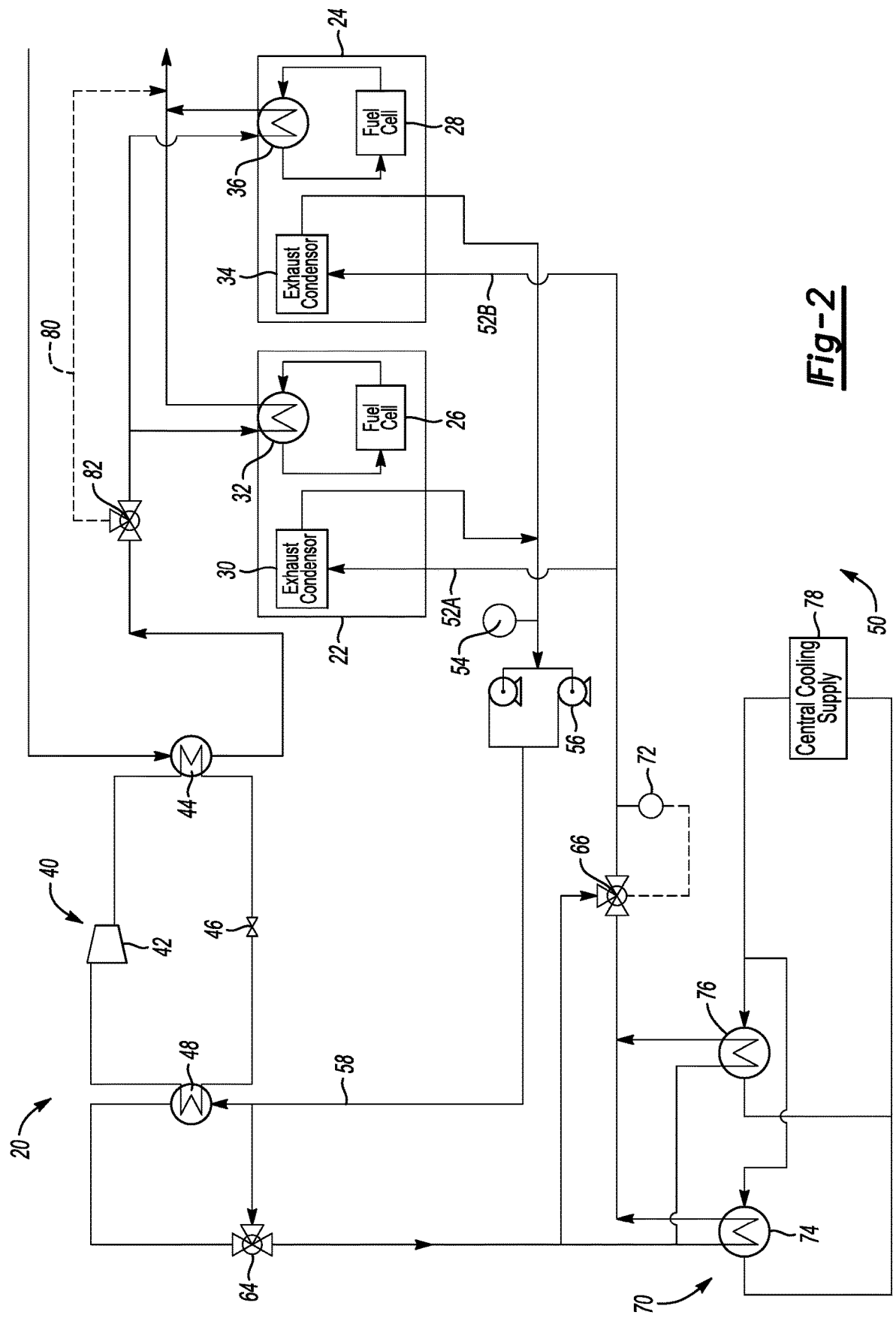
FIG. 2 schematically illustrates another embodiment.

In FIG. 1, each of the fuel cell power plant units has a dedicated cooling module associated with it. The example of FIG. 2 includes a centralized cooling arrangement 70 for the auxiliary cooling circuit 50. In this example, a temperature sensor 72 controls the bypass valve 66 to selectively direct coolant fluid from the third portion 60 through one or more heat exchangers 74, 76 before that coolant is returned toward the exhaust 30, 34 of the fuel cell power plant units. FIG. 2 also illustrates a cooling system supply 78 that may be a storage container for glycol or another coolant fluid.

The centralized cooling arrangement 70 or the dedicated cooling modules 62A, 62B provide a way of rejecting heat under circumstances where the heat pump 40 is not operating or otherwise not absorbing heat from the coolant flowing within the circuit 50.

Another feature of the example embodiment of FIG. 2 is that it illustrates a bypass 80 and a bypass valve 82 that is selectively useable for directing fluid from the condenser 44 away from the high grade heat exchangers 32, 36.

Utilizing heat from the exhaust as described above, provides enhanced heat pump efficiency because lower power input is required to achieve desired temperatures from the heat pump 40. Additionally, not utilizing an intermediate low grade heat exchanger associated with the cell stack assembly allows for obtaining a higher input temperature to the evaporator of the heat pump. Additionally, when the exhaust has reformer exhaust associated with it, further increased temperature supply to the evaporator becomes possible.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

We claim:

1. A system, comprising:
   a plurality of fuel cell stack assemblies each including a plurality of fuel cells that are configured to generate electricity based on an electrochemical reaction, each of the fuel cell stack assemblies including an exhaust;
   a heat pump including an evaporator, a condenser, a compressor and an expansion valve; and
   a coolant loop that is external to the plurality of fuel cells of each of the fuel cell stack assemblies, the coolant loop having first portions respectively associated with the exhaust of each of the fuel cell stack assemblies such that heat from the exhaust of each of the fuel cell stack assemblies increases a temperature of coolant fluid in the first portions, the coolant loop having a second portion downstream of the first portions, each of the first portions delivering coolant fluid into the second portion, the second portion being associated with the evaporator such that heat from the coolant fluid in the second portion increases a temperature of the evaporator.

2. The system of claim 1, comprising
   a bypass valve coupled with the second portion, the bypass valve being selectively actuated to direct coolant fluid in the second portion to selectively control heat transfer from the second portion to the evaporator.

3. The system of claim 1, comprising an exhaust condenser associated with the exhaust and wherein the first portions of the coolant loop are situated for heat from the exhaust condenser to increase a temperature of coolant fluid in the first portions.

4. The system of claim 1, comprising
   a high grade heat exchanger associated with the plurality of fuel cells; and
   a heat delivery network downstream of the condenser of the heat pump, the heat delivery network directing heated fluid at least partially through the high grade heat exchanger.

5. The system of claim 1, wherein
   the coolant loop includes a third portion that carries coolant fluid from the second portion toward the exhaust of each of the fuel cell stack assemblies; and
   the coolant loop includes at least one heat dissipation element situated to decrease a temperature of coolant fluid in the third portion.

6. The system of claim 5, wherein
   a temperature of coolant fluid in the first portions is between 40° and 60° C.;
   a temperature of coolant fluid in the second portion upstream of the evaporator is approximately the same as the temperature of the coolant fluid in the first portions; and
   a temperature of coolant fluid in the second portion downstream of the evaporator is between 20° and 30° C.

* * * * *